United States Patent Office

2,982,697
Patented May 2, 1961

2,982,697

PRESERVATION PROCESS

Elmer A. Weaver, Spring Mount, Pa., assignor to the United States of America as represented by the Secretary of Agriculture No Drawing. Original application Dec. 18, 1957, Ser. No. 703,711. Divided and this application Oct. 3, 1958, Ser. No. 769,276

1 Claim. (Cl. 195—68)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a division of application Serial No. 703,711, filed December 18, 1957.

This invention relates to a process of treating the enzyme tomato pectase so that it may be preserved thereafter at a temperature above freezing, as for example, at room temperature (70° to 75° F.), without spoiling and with retention of the characteristics of freshly prepared material, thereby obviating the need of pasteurizing or sterilizing treatments which cause loss of potency of the enzyme, as well as the need for utilizing freezing temperatures, and the accompanying costly processing equipment necessary for carrying out these procedures.

It was discovered that the addition of sodium sorbate, potassium sorbate or sorbic acid at levels in the range of 0.025 to 0.10% by weight plus a heat treatment, which is a combination of time and temperature insufficient per se to preserve, has the unique effect of preventing or suppressing microbial spoilage for time intervals in excess of 90 days at room temperature while at the same time preserving the characteristics of freshly prepared tomato pectase. A particular advantage in the use of sodium sorbate as a chemical preservative, is the absence of any detectable taste or off-flavor due to its presence in the treated product. Its use is not to be construed as prohibitive over other preservatives having similar properties. The relatively low temperatures and exposure times of the heat treatment cause no significant differences in the flavor, texture and characteristics of the heated product from those it possessed prior to heating. With the use of this inventive process it was possible to maintain enzyme potency in the tomato pectase preparation over an extended period of time without encountering microbial spoilage.

Described processes are given hereinafter for the preservation of the enzyme tomato pectase. This is accomplished by adding sodium sorbate, potassium sorbate, or sorbic acid at levels in the range of 0.025 to 0.10% by weight, and 1-ascorbic acid in concentrations of about 0.015% by weight. The product is packed in clean containers such as glass bottles, followed by a heat treatment which is a combination of time and temperature insufficient per se for preservation, preferably heating to a temperature in the range of 100 to 120° F. for a time interval of five to fifteen minutes and cooling to room temperature. Alternatively the product can be packaged following the heat treatment.

The following example is illustrative of the invention:

A crude pectase extract was prepared from ripe tomatoes according to the method of Hills and Mottern (J. Biol. Chem. 168: 651 (1947)). A portion of this extract was treated according to the process of this invention as follows: to 200 ml. of the tomato pectase extract was added 0.8 ml. of a 25% sodium sorbate solution, the mixture heated to 120° F. for 10 minutes, then cooled to room temperature. This solution showed no mold or bacterial growth after 7 days storage at room temperature (70 to 75° F.). The untreated control showed fermentation after 1 day and mold growth after 3 days. The contamination of microorganisms made the untreated enzyme solution unsuitable for further use. On the other hand the extract preserved by mild heat and sorbate was suitable for use and retained nearly all of the original enzyme activity after 7 days.

Sorbic acid, sodium sorbate, or other sorbate salts may be used as the added agent, but the sodium salt is preferred because of its greater solubility in water, especially in water at the pH range of fruit juices. Levels of concentration of sodium sorbate in the range of 0.025 to 0.10% by weight in combination with heat treatment in the range of 100 to 130° F., 100 to 120° F. being the preferred range, for 5 to 15 minutes, were sufficient to prevent spoilage due to microbial activity during storage periods up to 90 days at ordinary room temperature. Within the limits disclosed the factors may be varied inversely to achieve approximately equivalent preservative action.

While the sequence of performing the combination of heating and adding the preserving agent is not considered critical, it is logical to apply the heat treatment last so that the containers need not be reopened. It is preferable that the steps of the process follow one upon the other to minimize the microbial propagation which can occur until the infentive process is completed.

The process of this invention is especially valuable in preserving materials in the absence of refrigeration. However, applying the process to products which will be stored at temperatures below room temperature, for example at 50° F., is still advantageous because shelf storage life is greatly extended.

I claim:

A process for preventing the growth of microorganisms in an aqueous solution of tomato pectase at a temperature above freezing comprising mixing with an aqueous solution of tomato pectase an amount of a preserving agent selected from the group consisting of 1-ascorbic acid, sodium sorbate, potassium sorbate, and sorbic acid to provide a concentration in the range of 0.015 to 0.10% by weight of said agent in the liquid medium, packaging the mixture in a clean, closed container, heating the packaged mixture to a temperature in the range of about from 100° to 130° F. for a time interval of about from 5 to 15 minutes, and storing the resulting product at a temperature above freezing.

References Cited in the file of this patent

UNITED STATES PATENTS 2,379,294 Gooding _____ June 26, 1945

FOREIGN PATENTS 529,728 Great Britain _____ Mar. 27, 1940

OTHER REFERENCES

Science News Letter, page 327, May 27, 1950.
"Food Engineering," August 1953, pp. 127 and 151, article entitled "New Fungicide Sorbic Acid."
"Food Research," vol. 19 (1954), pp. 33 to 43, The Garrard Press, Champaign, Illinois.
Food Technology, vol. 9, 1955, article by Beneke et al., pp. 486 to 488, and article by Salunkhe on page 590, The Garrard Press, Champaign, Illinois.